United States Patent [19] [11] Patent Number: 4,700,889
Lucius et al. [45] Date of Patent: Oct. 20, 1987

[54] CONNECTING DEVICE FOR POWER SUPPLY AND HEATER EQUIPPED THEREWITH

[75] Inventors: Werner Lucius, Starnberg; Ernst Mosig, Iffeldorf; Josef Riedmaier, Pentenried, all of Fed. Rep. of Germany

[73] Assignee: Webasto-Werk W. Baier GmbH & Co., Gaiting, Fed. Rep. of Germany

[21] Appl. No.: 917,220

[22] Filed: Oct. 9, 1986

[30] Foreign Application Priority Data

Oct. 10, 1985 [DE] Fed. Rep. of Germany ....... 3536153

[51] Int. Cl.$^4$ .............................................. B60H 1/02
[52] U.S. Cl. ........................... 237/12.3 C; 126/110 C; 439/34
[58] Field of Search ............... 237/12.3 C; 126/110 C, 126/110 B; 432/222; 339/10, 119 R, 125 R

[56] References Cited

U.S. PATENT DOCUMENTS 4,532,914  8/1985  Thomas et al. .................... 432/222

FOREIGN PATENT DOCUMENTS 2253643  7/1975  France ........................... 237/12.3 C Primary Examiner—Henry A. Bennet
Attorney, Agent, or Firm—Sixbey, Friedman & Leedom

[57] ABSTRACT

A connecting device for supplying power to equipment in heating devices, particularly, auxiliary vehicle heating devices, which connecting device serves to commonly and centrally supply a combustion motor, a control device, a circulating pump, a solenoid valve, an ignition spark unit, a flame monitoring device, and, if utilized, a preheating device for a burner nozzle assembly. All connections and connecting devices, like plug connectors, are housed and combined in a common, central connecting component which can be secured on a flange of the heating device, and can be attached to a part of the heater housing. Appropriately, the connecting component is designed in the form of a housing and contains the electrical connections to be actuated in the form of printed circuit boards, or the like. In order to avoid connection errors and in order to achieve a low-loss connection, the plug connectors for the devices to be connected are arranged as close as possible to the respective device to be connected; also, a plug connector is provided at the peripheral surface of the connecting component that is accessible via an opening in the flange, which connector is intended for the connection of an external power supply such as that of a vehicle.

21 Claims, 5 Drawing Figures

CONNECTING DEVICE FOR POWER SUPPLY AND HEATER EQUIPPED THEREWITH

BACKGROUND AND SUMMARY OF THE INVENTION

The invention relates to a connecting device for the power supply to equipment in heating devices, particularly auxiliary heating devices in vehicles. Generally, the following are involved: a combustion motor, a control unit for the heating device, a circulating pump, a solenoid valve, an ignition spark unit, a flame monitoring device, and in certain cases, a preheating device for the burner nozzle assembly.

Up to this point, it has been customary to use a cable harness to bring the required connecting lines together and then to attach the individual cables for the respective devices, which were ultimately to be connected to the individual pieces of equipment for the purpose of supplying power to such equipment or operating parts. A cable harness, however, not only occupies a relatively large space in the area of the burner unit, but has also proven to lead to connecting errors during assembly when, for instance, there is a mix-up of the individual cable leads. While a final check of the heating device should reveal such errors, the fact remains that the heating device has to be dismantled and connections have to be reworked. Also, the components involved may be damaged during this time-consuming and complicated process, resulting in a further drawback, since an exchange of defective operating parts is costly.

Accordingly, it is a primary objective of the invention to provide a connection device for a power supply which eliminates the problems outlined above; which connection device has a compact design, is easily assembled and substantially eliminates errors in connecting the equipment. Furthermore, it is a particular objective that the connecting device can be universally used for various types of heating equipment facilitating cost-effective production and inventory.

In accordance with the invention, the connecting device has a central common connecting component which collectively combines the connections and connecting devices for equipment to be connected. This central connecting component can be secured to a flange of a heating device housing part supporting the burner unit.

In the arrangement, in accordance with the invention, there is no requirement for a cable harness in the area of the burner unit, as the central connecting component simultaneously assumes the function of distributing the power supply. The main current supply is connected with its central connecting component, and all additional distribution elements are provided within the connecting component. Since the supply lines of the individual components do not have to be separately attached during assembly and connection of the necessary operating equipment, assembly is considerably simplified. Moreover, errors in connecting the lines to the respective equipment are eliminated, and there is a total saving in installation space, with the result that a compact design of such a heating device is achieved with improved safety.

Preferably, there are plug connectors attached to the connecting component for equipment to be connected, so that such equipment can be directly connected with the common connection component. Via the plug connection the equipment to be connected can also physically be secured to the connection component. If the equipment requires a switching element, like a relay, such relay, in accordance with the invention, is appropriately secured to the connection component, and, preferably, is secured in proximity of the plug connectors for the devices to be associated with the relay. Whether the equipment is connected directly at the connecting component, or is connected by interconnection of a relay, depends upon the operating mode and type of equipment to be connected. For example, connection via a relay is required for a combustion motor or a circulating pump. In order to avoid errors during connection, the relays are arranged in proximity of the plug connectors for the equipment to be connected.

In accordance with a further refinement of the invention, the connecting component is formed as a housing containing the electrical connection to be actuated and the current distributors. Thus, these are contained and protected in the housing eliminating the requirement for long line connections which tend to be wasteful. Hereby, the connection component can be designed as a unitized connection plate or printed circuit board, for instance.

Preferably, the plug connectors and switching devices for the equipment to be connected to the connecting component are provided in close proximity to the equipment to be connected at the component, so that a direct connection via plug contacts can be established. For instance, the following are arranged on the rear side of the connecting component, i.e., the side facing away from the burner unit: the switching device for the combustion motor with its associated plug connection, a plug connection for the control unit and motor with its associated plug connection, a plug connection for the control unit, and the switching device for the circulating pump. Furthermore, at the peripheral surface of the connection component, there may be provided a plug connector which preferably is accessible via an opening in the flange so that, after completion of the heating device assembly, connection to a vehicle or other external power supply can be effected in a simple and expedient manner.

On the front side of the connection component (the side facing the burner unit), there are provided connecting devices for the ignition spark unit, a plug connection for the flame monitoring device, and a plug connection for the solenoid valve. Since these components are directed towards the combustion chamber of the heating device, they are combined on the front side of the connection component. If the heating device also comprises a preheating device for the burner nozzle assembly, a plug connector therefor is also provided on this front side. In order to avoid misalignments and surface mismatches during assembly of the connection component to the flange of the heating device housing part, the outer contour of the connection component is selected such that it will mate against receiving devices for the combustion motor in a positively engaged manner, whereby such receiving devices (which, for instance, may be formed by castings in the flange are) are, however, accessible even after the connection component has been mounted at the flange.

Thus, in the connecting device in accordance with the invention, the operating parts to be connected in the form of plug connectors, are attached at a common central connection component, so that substantially low-loss connections are obtained with a surprisingly simplified assembly. The alignment of the central connection component can always be adapted to the requirements of the respective type of heating device in that, for instance, individually prepared and provided plug connectors are not utilized, and are only utilized when required. Hereby, the common central connected component is universally applicable to heating devices of different heating capacity. Moreover, defective equipment to be replaced can be quickly and easily exchanged at the plug connectors provided.

These and further objects, features and advantages of the present invention will become more obvious from the following description when taken in connection with the accompanying drawings which show, for purposes of illustration only, several embodiments in accordance with the preset invention.

DETAILED DESCRIPTION OF THE PREFERRED EMBODIMENT

Figure 1:
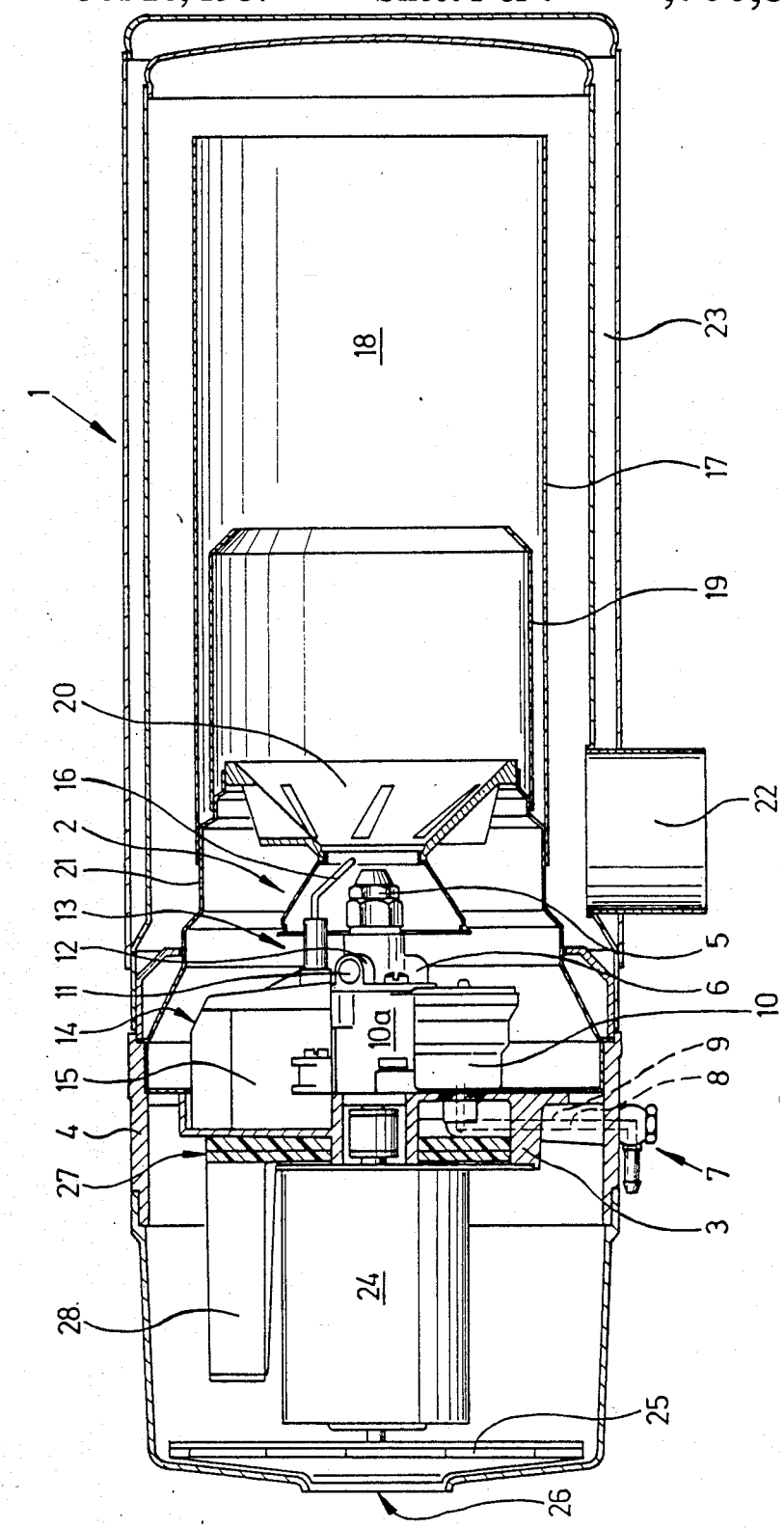
FIG. 1 is a schematic sectional view through a heating device employing a connecting device in accordance with a preferred embodiment of the invention.

FIG. 1 schematically depicts a heating device, which in its entirety is designated with numeral 1, and which has an atomization burner which is designated generally by numeral 2. Atomization burner 2 is attached to a flange 3 of a housing part 4. As depicted, the burner 2 has an atomizing burner nozzle 5 which is supported by a burner nozzle assembly 6. A fuel supply 7 (having a feed line 8 and a return line 9 that are depicted by broken lines) is formed in flange 3 of the housing part 4, to supply fuel to the burner nozzle 5. Feed line 8 terminates in a filter 10, which is upstream of fuel pump 10a, as depicted schematically in FIG. 1. Fuel is supplied from feed line 8 to burner nozzle 5 via an interposed solenoid valve 30 (not depicted in FIG. 1, but schematically shown in FIG. 2). In the example depicted, atomization burner nozzle 5, with burner nozzle assembly 6, the fuel pump 10a, the filter 10 and the solenoid valve 30 form a unit which can be attached to flange 3. FIG. 1 also shows a through-bore 11 which is disposed in a shoulder 12 of burner nozzle assembly 6. Through-bore 11 receives a preheating device 32 (FIG. 2), preferably a self-contained heating element.

Furthermore, atomization burner 2 has a ignition device designated 13 in its entirety, which comprises an ignition spark unit 14 with a housing 15. Preferably, two ignition electrodes 16, only one of which is shown in FIG. 1, are mounted at housing 15, either by way of a plug connection, or alternatively, as a fully integrated part.

The atomization burner 2 extends into a combustion chamber 18 created by combustion tube 17. An insert 19 is arranged in the combustion chamber 18 for the purpose of flame support. Insert 19 is carried by a mount 21 for a vorticization element 20 at a distance axially downstream of burner 2 within the housing of heating device 1.

The combustion gases are passed from combustion chamber 18 to an exhaust gas outlet 22 after having been deflected at the downstream end of combustion tube 17 (i.e., the end away from burner 2). Combustion tube 17 is surrounded by a double wall heat exchanger arrangement in whose annular space 23 a heat exchange medium, e.g., water, is circulated from an inlet to an outlet thereof, which are not depicted. The heat exchange medium is heated in annular ring 23 by the exhaust gas as it flows counter-currently to the path of the exhaust gas, when the heating device 1 is switched on.

As can be seen from FIG. 1, a combustion motor 24 is provided at flange 3, on the opposite side from atomization burner nozzle 5. Motor 24 simultaneously drives a combustion air blower 25 and a fuel pump 10a. the combustion air flows into the heater inlet 26 and, aided by the combustion blower 25, is conveyed to a mixture treatment zone at burner nozzle 5.

A connecting device is designated generally by reference numeral 27 and serves to simultaneously supply power to different components of the heating device, like combustion motor 24, ignition spark unit 14, flame monitoring device 31, preheating device 32 for the nozzle assembly and the like. Connecting device 27 is provided between combustion motor 24 and the rear side of flange 3 (the side 4 facing away from the burner nozzle 5). Cooperating with this connecting device 27 is a control device 28, which preferably is joined with the connecting device 27 by way of a plug connector.

Figure 2:
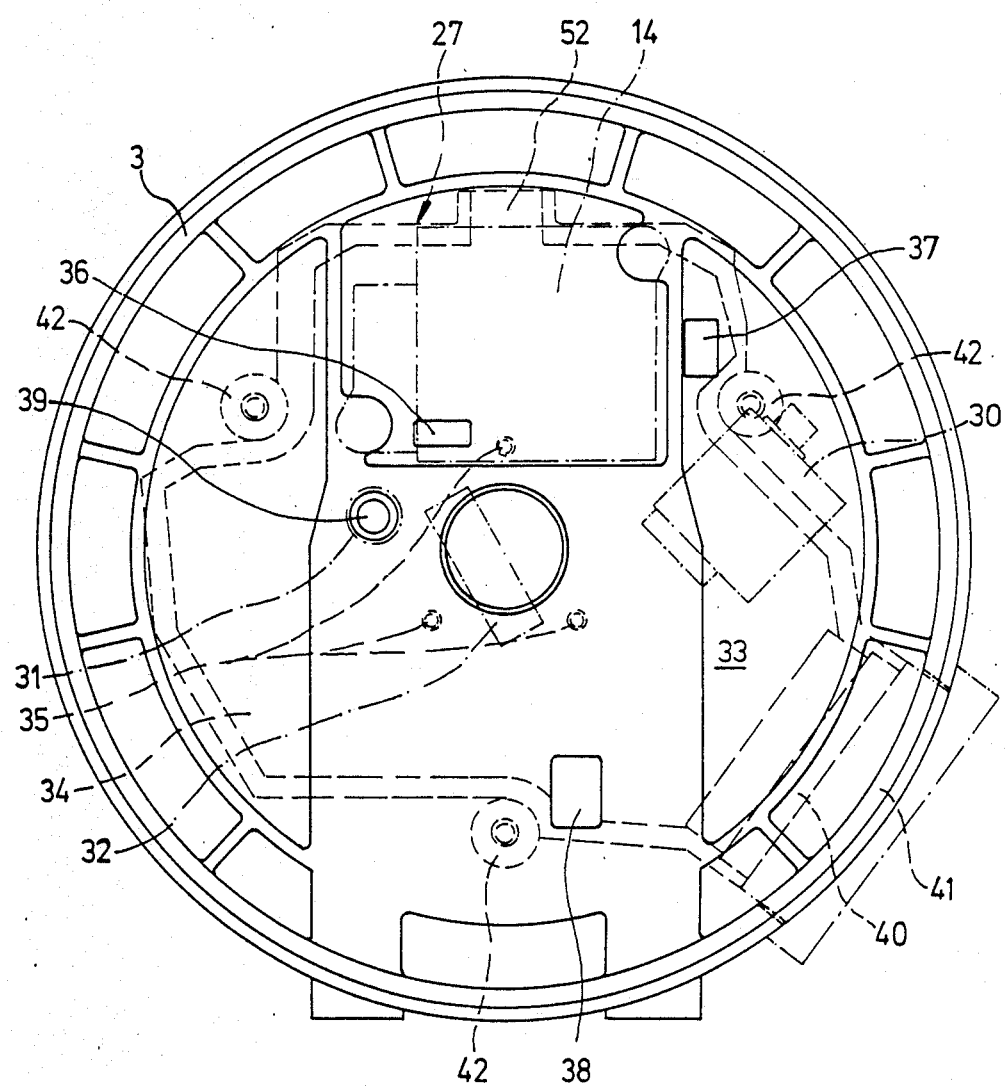
FIG. 2 is a front view depicting the connecting device attached at the flange of a housing of the heating device.
Figure 3:
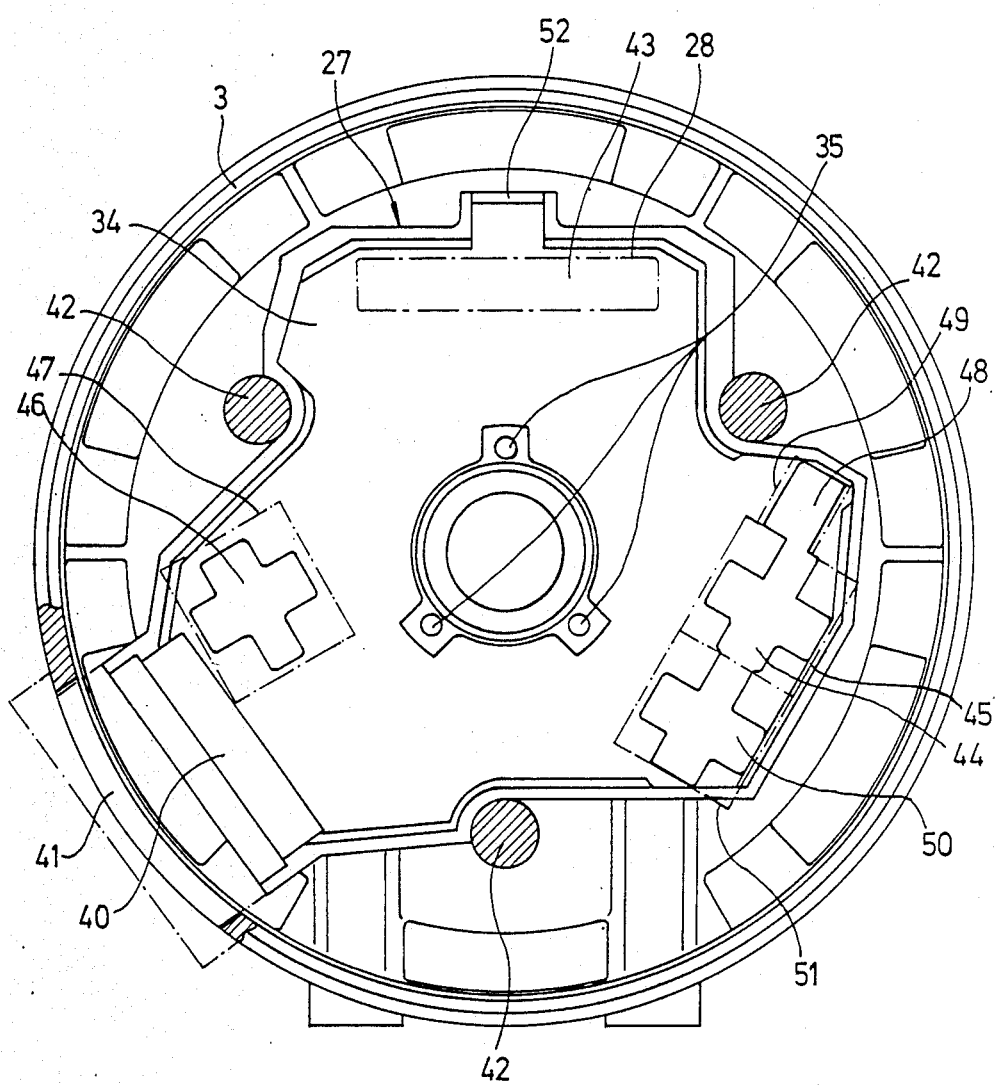
FIG. 3 is a rear view depicting the connecting device attached at the housing flange.

FIGS. 2 and 3 show a connecting device, in front and rear views respectively, as disposed at flange 3 of housing part 4 in FIG. 1. Moreover, dash-dotted lines in FIG. 2 indicate the respective units to be connected, like ignition spark unit 14, solenoid valve 30, flame monitor 31, and a preheating device 32 for the nozzle assembly. FIG. 2 shows a front (nozzle side) surface 33 of a common central connecting component 34 which comprises the connections and connecting devices of connecting unit 27. Preferably, this connecting component 34 is in the form of a housing containing the electrical connections to be actuated, for example, printed circuit boards. These items are not further detailed in the drawing. As can be further seen from FIG. 2, connecting component 34 is attached at the surface of flange 3 that faces away from atomization burner 2 (see FIG. 1) so that connecting component 34 with its contours can only be seen in broken lines in FIG. 2. As shown in FIG. 2, three bores 35, through which screws can be inserted, are provided for securing the connecting component 34 at flange 3, at appropriate points.

Connecting component 34 has a plug connector 36 on front surface 33 for connecting ignition spark unit 14, a plug connector 37 for connecting solenoid valve 30, a plug connector 38, which is intended for the preheating device of the burner nozzle assembly 32 when such is utilized, and a plug connector 39 for the flame monitoring device, like a flame probe, for instance, in the form of a sensor. Extending over the peripheral area of connecting component 34, there is a plug connector 40 intended for the connection with a vehicle or other external power supply. This plug connector is accessible via opening 41 in flange 3, even when connection device 27 is mounted to flange 3, and flange 3 itself is secured at housing part 4 (see FIG. 1). Thus, connection for the vehicle power supply or the connection for another external power source is not obstructed after heating device 1 has been fully assembled.

Moreover, FIG. 2 depicts castings 42 which form receiving devices for combustion motor 24 (see FIG. 1). In accordance with FIG. 3, these castings 42 are free accessible after connecting part 34 has been firmly anchored to flange 3, so that the motor with its mounting flange can be supported at these castings 42 and be secured thereto, such as by screws threaded into bores in the free ends thereof.

Also, as can be seen from FIGS. 2 and 3, the outer contour of connecting component 34 is correspondingly adapted to matingly engage against castings 42 and this arrangement facilitates that connecting component 34 can only be attached at flange 3 in a certain, predetermined position, so that errors in establishing linkages and connections to the components can be avoided.

FIG. 3 shows the front side of the common central connecting component 34 (the side which faces away from combustion chamber 18 and toward the combustion motor 24 depicted in FIG. 1). Identical or similar parts in FIGS. 1 and 2 are designated with identical reference numerals in FIG. 3. Also, FIG. 3, as in FIG. 2, shows connection 40 at the peripheral surface of connecting component 34, in the form of a plug connector for the vehicle power supply connection, and the associated opening 41 in flange 3.

On the face area of connecting component 34 shown in FIG. 3, the following are disposed: a plug connector 43 for the connection of the control unit 28 (see FIG. 1); a plug connection 44 for a switching device, like a relay 45 for the combustion motor 24; a plug connector 46 for a switching device, like a relay 47 for a fuel pump; a plug connection 48 for inserting a plug part 49 for connecting combustion motor 24; a plug connection 50 for the preheating device of the burner nozzle assembly, which preferably is formed by a self-contained heating element, having a relay 51 for activating the preheating device for burner nozzle assembly 32; and a connecting device 52 for a temperature sensor and a temperature safety device. In this connection, the switching units, like relays 45, 47 and 51, for example, are directly fitted over associated plug connections 44, 46 and 50, and are secured at component 34 via these plug connectors. The switching devices and the respective plug connectors are arranged in such close proximity that, in the alignment of the connecting component part 34 with the relays, mix-ups in the switching devices for the respective components, are avoided. Moreover, if cable connections are provided at all, they are selected to be as short as possible, which means that the plug connections are also located as close as possible to the corresponding operating units to be connected. This becomes especially clear when FIGS. 2 and 3 are viewed in light of FIG. 1, and it can be seen that the operating units and components to be connected are directly coordinated to the appropriate points of the respective plug connections.

Although not depicted in detail, it is to be understood that not all plug connectors depicted have to be engaged; in other words, plug connector 50 for the preheating device of the burner nozzle assembly 32, for instance, can remain unused if the type of heating device selected at the time does not require such a burner nozzle assembly preheating device. This correspondingly applies for engagement of the other plug connections. Also, if necessary, control unit 28, depicted as a separate component, can be integrated into connecting component 34 itself, so that the plug connector as well as the control unit 28 depicted in the drawing can be eliminated in such form. Still further plug connectors for connecting additional devices can be provided for a specific type of heating device, if required. The connecting component 34 of the connecting device 27 is preferably disposed and designed such that, without alterations, it can be used for several different types of heating devices, such as heaters which may have differing heat output, in which case only the occupation by the devices to be connected has to be varied accordingly.

Figure 4A:
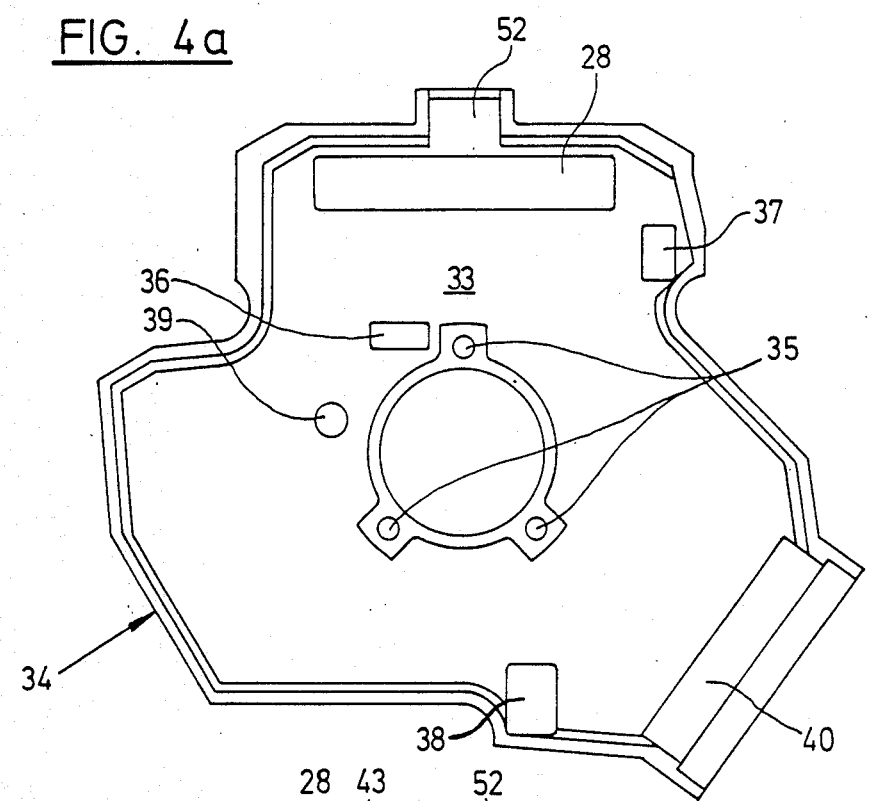
FIGS. 4a and 4b are front and rear views of the connecting device itself, i.e., before mounting at the flange.
Figure 4B:
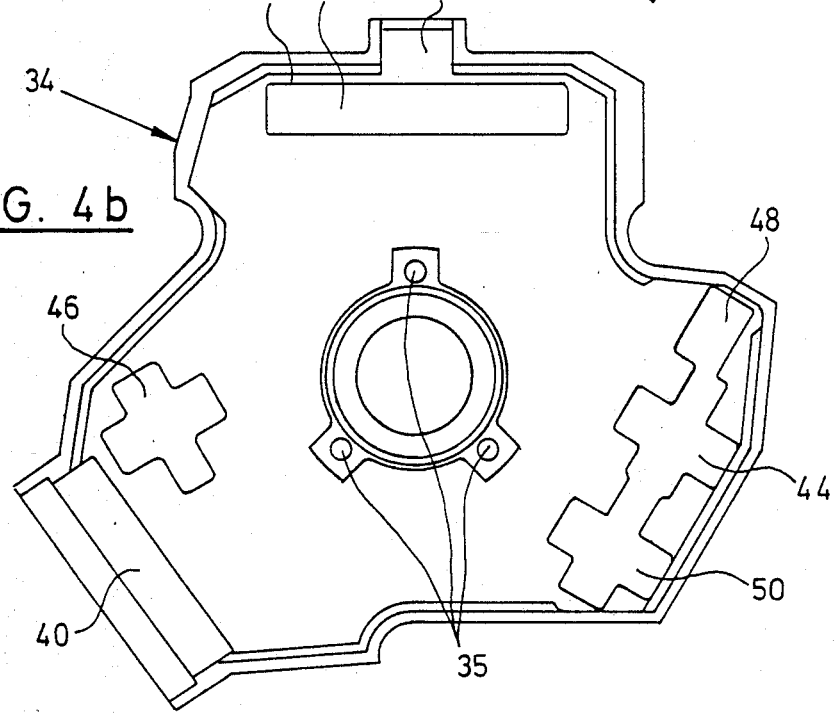

Finally, FIGS. 4a and 4b show the connecting component 34 of connecting device 27 by itself for illustration purposes, and the plug connections depicted there are assigned the same reference numerals as in FIGS. 2 and 3.

As can be seen from the description above, the common central connecting component 34 of connecting device 27 combines all possible electrical connections for the corresponding operating parts to be connected by way of plug connectors, whereby the devices to be connected are readily accessible and, therefore, can be exchanged quickly and easily by means of plug connectors in the event of a malfunction. Accordingly, since this connecting device 27 permits the joining of several cables to a cable harness in heating device 1 itself to be dispensed with, not only is the assembly of the heating device simplified, but errors in connecting the operating components are avoided, and more particularly, the connections have extremely low power loss and can be housed in a separate arrangement in heating device 1. In this connection, it is to be understood that the screws for fastening the connecting component 34 can be dispensed with.

While we have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

We claim:

1. Connecting device for power supply equipment, such as a combustion motor, control device, fuel pump, solenoid valve, ignition spark unit, flame monitoring device, burner nozzle assembly preheating device, and the like, in heating devices, particularly auxiliary heating devices for vehicles, characterized in that the connections and connecting devices for all said equipment is combined in a common central connecting component which is securable to an internal flange of a heating device housing part supporting a burner unit.

2. Connecting device according to claim 1, wherein the connecting component has plug connectors for the equipment to be connected.

3. Connecting device according to claim 2, wherein said plug connectors serve for the direct connection of items of said equipment.

4. Connecting device according to claim 3, wherein at least several items of said equipment, like the combustion motor, solenoid valve, circulating pump, and the like are connected via a relay-like switching device, and each switching device is attached to the common connecting component.

5. Connecting device according to claim 4, wherein each switching device is arranged in the proximity of the plug connector of the respective equipment to be connected.

6. Connecting device according to claim 5, wherein the connecting component is a housing which contains electrical connections for the equipment.

7. Connecting device according to claim 1, wherein the connecting component has a plate-like shape.

8. Connecting device according to claim 4, wherein a relay for the combustion motor with an associated plug connector, a plug connection for the control device, and relay for the fuel pump are disposed on a rear surface of the connecting component which faces away from the burner unit.

9. Connecting device according to claim 1, wherein a plug connector is provided at a peripheral surface of the connecting component for connection with a vehicle power supply.

10. Connecting device according to claim 8, wherein a front surface of the connecting component is provided with connecting devices for the ignition spark unit, a plug connector for the flame monitoring device and a plug connector for the solenoid valve.

11. Connecting device according to claim 10, wherein a plug connection for a burner nozzle assembly preheating device is provided on said front surface.

12. Connecting device according to claim 1, wherein the outer contour of the connecting component is shaped for matingly engaging against receiving devices for the combustion motor in a manner leaving the receiving devices accessible after assembly of connecting component to said flange.

13. Connecting device according to claim 3, wherein the control device is arranged directly on a respective plug connection.

14. Connecting device according to claim 1, wherein the control device is integrated into the connecting component.

15. A heater, particularly a vehicle auxiliary heater, of the type having a burner unit and electrically powered equipment including a combustion motor, a control device, a fuel passage, a solenoid valve, an ignition spark unit, a flame monitoring device and the like disposed within a heater housing, wherein a connecting device for supplying electrical power to all said equipment is provided, said connecting device having all connections and connecting devices for said equipment combined into a common central connecting component which is secured to an integral flange of said heater housing that supports the burner unit.

16. A heater according to claim 15, wherein plug connectors are provided in said connecting component for the direct plug-in connection of at least several items of said equipment.

17. A heater according to claim 15, wherein a plug connector is provided at a peripheral surface of the connecting component for connection with a vehicle power supply.

18. A heater according to claim 17, wherein the plug connector for connection with the vehicle power supply is accessible from the exterior of the heater via an opening in said flange of the heater housing.

19. A heater according to claim 15, wherein said flange is provided with receiving devices for mounting of the combustion motor, and wherein the connecting component is provided with a contour that is shaped to matingly engage against said receiving devices in a manner leaving said receiving devices accessible for mounting of the combustion motor thereto.

20. A heater according to claim 19, wherein said contour is constructed to enable said mating engagement to be achieved, and therby mounting of the connecting device to the flange, in only a single predetermined position.

21. A connecting device according to claim 14, wherein the connecting device is in the form of printed circuit boards.

* * * * *